US011240065B2

(12) United States Patent
Guichard et al.

(10) Patent No.: US 11,240,065 B2
(45) Date of Patent: Feb. 1, 2022

(54) NSH ENCAPSULATION FOR TRAFFIC STEERING

(71) Applicant: Futurewei Technologies, Inc., Plano, TX (US)

(72) Inventors: James N. Guichard, Hollis, NH (US); Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 17/020,787

(22) Filed: Sep. 14, 2020

(65) Prior Publication Data

US 2020/0412578 A1    Dec. 31, 2020

Related U.S. Application Data

(63) Continuation of application No. 15/958,794, filed on Apr. 20, 2018, now Pat. No. 10,778,464.

(51) Int. Cl.
*G06F 15/16* (2006.01)
*H04L 12/46* (2006.01)

(52) U.S. Cl.
CPC ...... *H04L 12/4633* (2013.01); *H04L 12/4604* (2013.01); *H04L 12/4645* (2013.01)

(58) Field of Classification Search
None
See application file for complete search history.

(56) References Cited

U.S. PATENT DOCUMENTS

| | | | |
|---|---|---|---|
| 2015/0200954 A1* | 7/2015 | Gourlay | H04L 49/354 726/4 |
| 2017/0026417 A1* | 1/2017 | Ermagan | H04L 63/0272 |
| 2017/0163569 A1* | 6/2017 | Koganti | H04L 49/25 |
| 2017/0180234 A1* | 6/2017 | Agrawal | H04L 63/1441 |
| 2017/0373990 A1* | 12/2017 | Jeuk | H04L 45/306 |
| 2018/0026884 A1* | 1/2018 | Nainar | H04L 45/50 370/392 |
| 2018/0159957 A1* | 6/2018 | Hooda | H04L 45/64 |
| 2019/0036736 A1* | 1/2019 | Gao | H04L 61/6022 |
| 2019/0132221 A1* | 5/2019 | Boutros | H04L 41/5041 |
| 2019/0238450 A1* | 8/2019 | Michael | H04L 43/0864 |
| 2019/0268267 A1* | 8/2019 | Pignataro | H04L 45/72 |
| 2019/0268383 A1* | 8/2019 | Maino | H04L 63/0428 |

* cited by examiner

*Primary Examiner* — Phyllis A Book
(74) *Attorney, Agent, or Firm* — James Anderson Harrison

(57) ABSTRACT

A method for establishing a tunnel between VTEPs includes receiving at an SDN controller a tunnel creation request to establish a VxLAN tunnel from a first VTEP to a second VTEP, determining a VxLAN tunnel of network nodes coupling the first VTEP to the second VTEP, assigning a SvcPI to the VxLAN tunnel, and sending a tunnel initiation command to the first VTEP, the tunnel initiation command causing the first VTEP to convert an Ethernet frame to a path-ID frame by adding an NSH encapsulation header and to forward the path-ID frame to the next network node in the VxLAN tunnel.

21 Claims, 6 Drawing Sheets

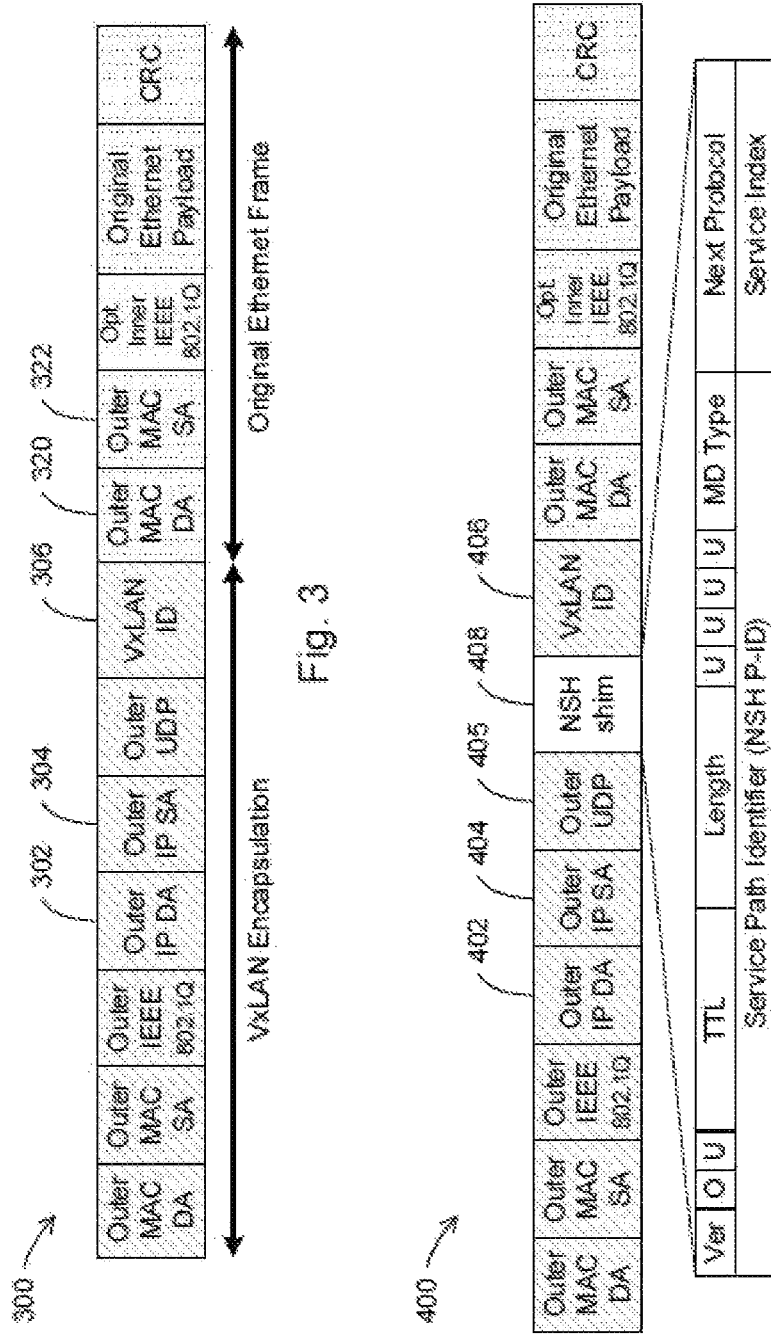

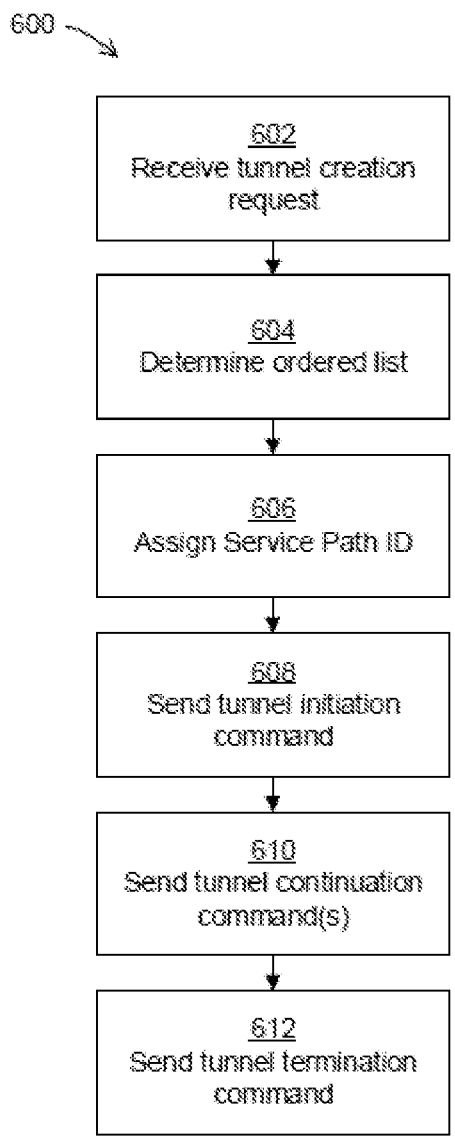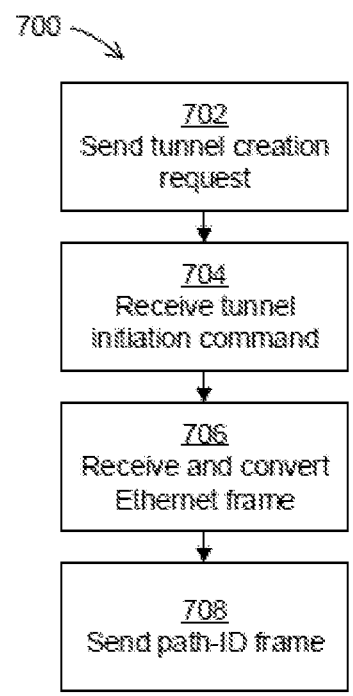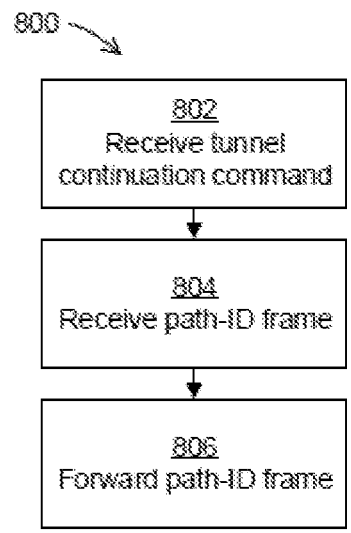
Fig. 6
Fig. 7
Fig. 8

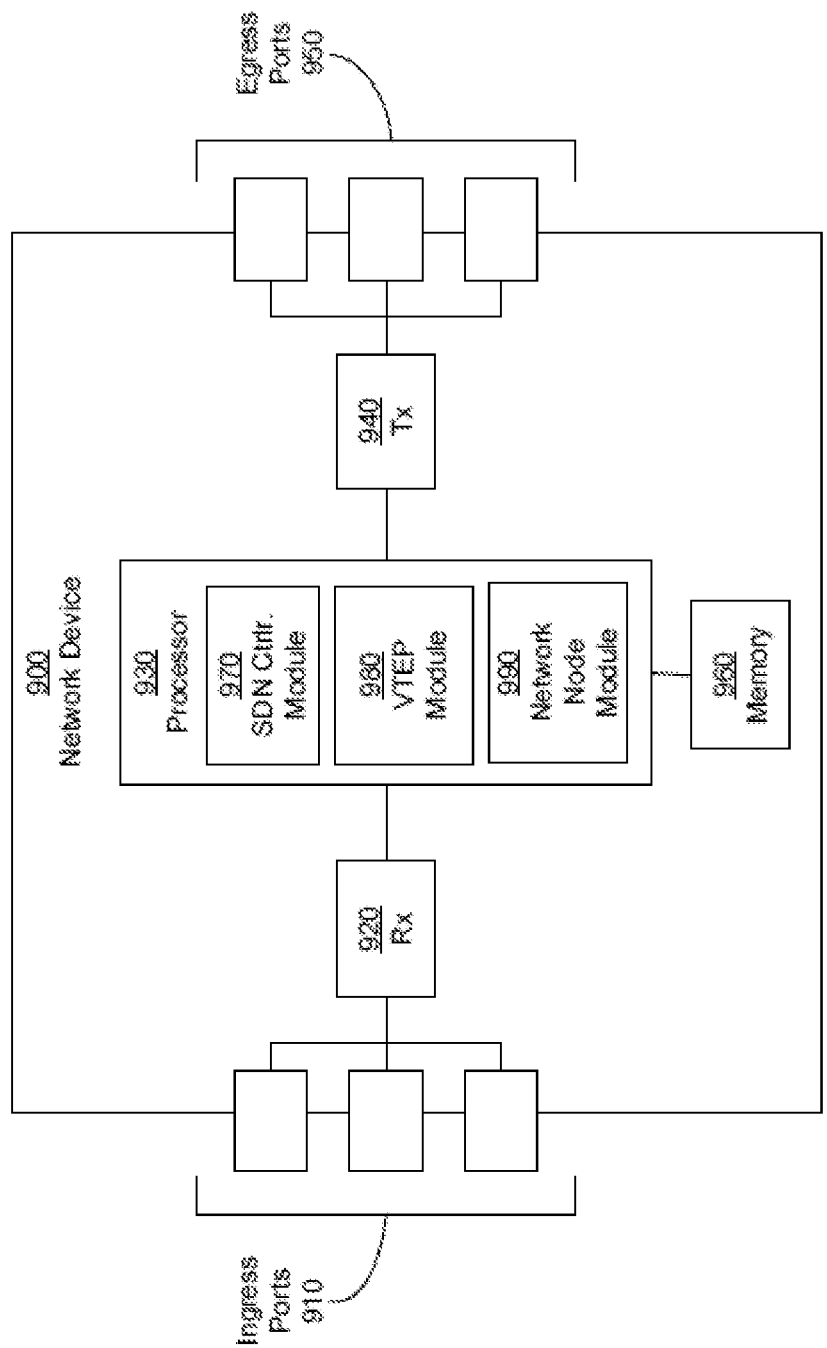

NSH ENCAPSULATION FOR TRAFFIC STEERING

CROSS-REFERENCE TO RELATED APPLICATIONS

This application is a continuation of U.S. patent application Ser. No. 15/958,794, filed on Apr. 20, 2018, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data centers often operate hosting components, such as data servers, for multiple tenants. The push for elastic provisioning of resources required by cloud computing systems and the general push toward virtualization for efficient use of resources often require that multiple tenants be hosted on a single hosting component. For security reasons, data centers use various techniques to isolate network traffic to ensure that one tenant does not have access to another tenant's data. Data centers with layer 2, data link layer, and/or routing systems often use virtual local area networks (VLANs) to isolate network traffic. VLAN solutions proved to be problematic for large data centers because VLAN provides 12-bit identifiers (IDs), allowing only 4094 unique VLANs to operate in a data center system. Data centers also use layer 3, network layer, and/or routing systems to allow multiple tenants to share the same set of layer 3 addresses within their networks and require that a data center employ additional forms of isolation.

Virtual Extensible Local Area Network (VxLAN) provides VLAN functionality over a hybrid layer 2 layer 3 network. Components on a VxLAN may send a layer 2 VLAN packet to a VxLAN tunnel endpoint (VTEP). The VTEP may encapsulate the VLAN packet in a VxLAN packet and transmit the resulting VxLAN packet over a layer 3 network. A VTEP in the destination network may receive the VxLAN packet, decapsulate the packet to obtain the original VLAN packet, and forward the VLAN packet over the layer 2 network. This system allows VLAN components in a layer 2 network to reach layer 2 components in a different layer 2 network. VLAN provides 24-bit IDs, allowing over 16 million unique VxLANs to operate in a data center system.

SUMMARY

In an embodiment, the disclosure includes a method for establishing a tunnel between VTEPs. The method includes receiving at a Software Defined Network (SDN) controller a tunnel creation request from a first VTEP to establish a VxLAN tunnel from the first VTEP to a second VTEP, the tunnel creation request comprising an Internet Protocol (IP) address of the second VTEP and a VxLAN Network Identifier (VNI); determining an ordered list of network nodes in a communication network, where a first network node in the list is coupled to the first VTEP and a last network node in the list is coupled to the second VTEP, the network nodes in the list forming a VxLAN tunnel from the first VTEP to the second VTEP; assigning a Service Path Identifier (SvcPI) to the VxLAN tunnel; and sending a tunnel initiation command to the first VTEP, the tunnel initiation command comprising the SvcPI, the VNI, and an IP address of the first network node in the list, the tunnel initiation command configured to cause the first VTEP to convert an Ethernet frame to a path-identifier (path-ID) frame by adding a Network Service Header (NSH) encapsulation header to the Ethernet frame, and to forward the path-ID frame to the IP address of the next network node in the list.

Optionally, in any of the preceding aspects, another implementation of the aspect provides the method further comprising, when the list includes intermediate network nodes between the first VTEP and the second VTEP, sending a tunnel continuation command to each of the intermediate network nodes, the tunnel continuation command comprising the SvcPI and an IP address of a corresponding next network node in the list, the tunnel continuation command configured to cause the intermediate network node to forward a path-ID frame that includes the SvcPI to the IP address of the next network node in the list. Optionally, in any of the preceding aspects, another implementation of the aspect provides the method further comprising, sending a tunnel termination command to the second VTEP, the tunnel termination command comprising the SvcPI, the tunnel termination command configured to cause the second VTEP to remove the NSH encapsulation header from a path-ID frame that includes the SvcPI and to forward the resulting Ethernet frame to an IP destination address specified in the Ethernet frame header. Optionally, in any of the preceding aspects, another implementation of the aspect provides the NSH encapsulation header comprises a VxLAN header comprising an NSH shim, the NSH shim comprising the SvcPI. Optionally, in any of the preceding aspects, another implementation of the aspect provides the NSH encapsulation header comprises a VxLAN header whose VNI field has been replaced by an NSH shim, the NSH shim comprising the SvcPI, and NSH metadata, the NSH metadata comprising the VNI. Optionally, in any of the preceding aspects, another implementation of the aspect provides the VNI comprises more than 24-bits. Optionally, in any of the preceding aspects, another implementation of the aspect provides the tunnel creation request comprises a Traffic Engineered (TE) tunnel requirement and the VxLAN tunnel is configured to satisfy the tunnel performance requirement.

In an embodiment, the disclosure includes a method for implementing a VxLAN tunnel between VTEPs. The method includes sending from a first VTEP to an SDN controller a tunnel creation request, the tunnel creation request configured to cause the SDN controller to establish a VxLAN tunnel from the first VTEP to a second VTEP, the tunnel creation request comprising an IP address of the second VTEP and a VNI; receiving from the SDN controller a tunnel initiation command, the tunnel initiation command comprising a SvcPI for the VxLAN tunnel, the VNI, and an IP address of a first network node in the VxLAN tunnel; and receiving an Ethernet frame and converting the Ethernet frame to a path-ID frame by adding an NSH encapsulation header to the Ethernet frame; and sending the path-ID frame to the IP address of the first network node in the VxLAN tunnel.

Optionally, in any of the preceding aspects, another implementation of the aspect provides the NSH encapsulation header comprises a VxLAN header comprising an NSH shim, the NSH shim comprising the SvcPI. Optionally, in any of the preceding aspects, another implementation of the aspect provides the NSH encapsulation header comprises a VxLAN header whose VNI field has been replaced by an NSH shim, the NSH shim comprising the SvcPI, and NSH metadata, the NSH metadata comprising the VNI. Optionally, in any of the preceding aspects, another implementation of the aspect provides the VNI comprises more than 24-bits. Optionally, in any of the preceding aspects, another implementation of the aspect provides the tunnel creation request comprises a TE tunnel requirement and the VxLAN tunnel is configured to satisfy the tunnel performance requirement.

In an embodiment, the disclosure includes a method for implementing a VxLAN tunnel between VTEPs. The method includes receiving at a network node a tunnel continuation command comprising a tunnel SvcPI and an IP address of a next network device in a VxLAN tunnel; receiving at the network node a path-ID frame comprising an NSH encapsulation header; and when a SvcPI in the NSH header matches the tunnel SvcPI, sending the path-ID frame from the network node to the IP address of the next network device in the VxLAN tunnel.

Optionally, in any of the preceding aspects, another implementation of the aspect provides the NSH encapsulation header comprises a VxLAN header comprising a NSH shim, the NSH shim comprising the SvcPI. Optionally, in any of the preceding aspects, another implementation of the aspect provides the NSH encapsulation header comprises a VxLAN header whose VNI field has been replaced by an NSH shim, the NSH shim comprising the SvcPI, and NSH metadata, the NSH metadata comprising a VNI. Optionally, in any of the preceding aspects, another implementation of the aspect provides the network node receives the path-ID frame from a VTEP. Optionally, in any of the preceding aspects, another implementation of the aspect provides the network node receives the path-ID frame from another network node. Optionally, in any of the preceding aspects, another implementation of the aspect provides the next network device in the tunnel is a VTEP. Optionally, in any of the preceding aspects, another implementation of the aspect provides the next network device in the tunnel is another network node.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates a conventional VxLAN frame.

FIG. 4 shows a VxLAN frame comprising a first NSH encapsulation header according to the disclosure.

FIG. 6 presents a method for establishing a tunnel between VTEPs, according to the disclosure.

FIG. 7 presents a method for implementing a VxLAN tunnel between VTEPs, according to the disclosure.

FIG. 8 presents a method for implementing a VxLAN tunnel.

FIG. 9 is a schematic diagram of a network device according to an embodiment of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are a method and system for an SDN controller to establish a VxLAN tunnel between VTEPs in a communication network, providing traffic steering and traffic engineering capability in a VxLAN environment.

Figure 1:
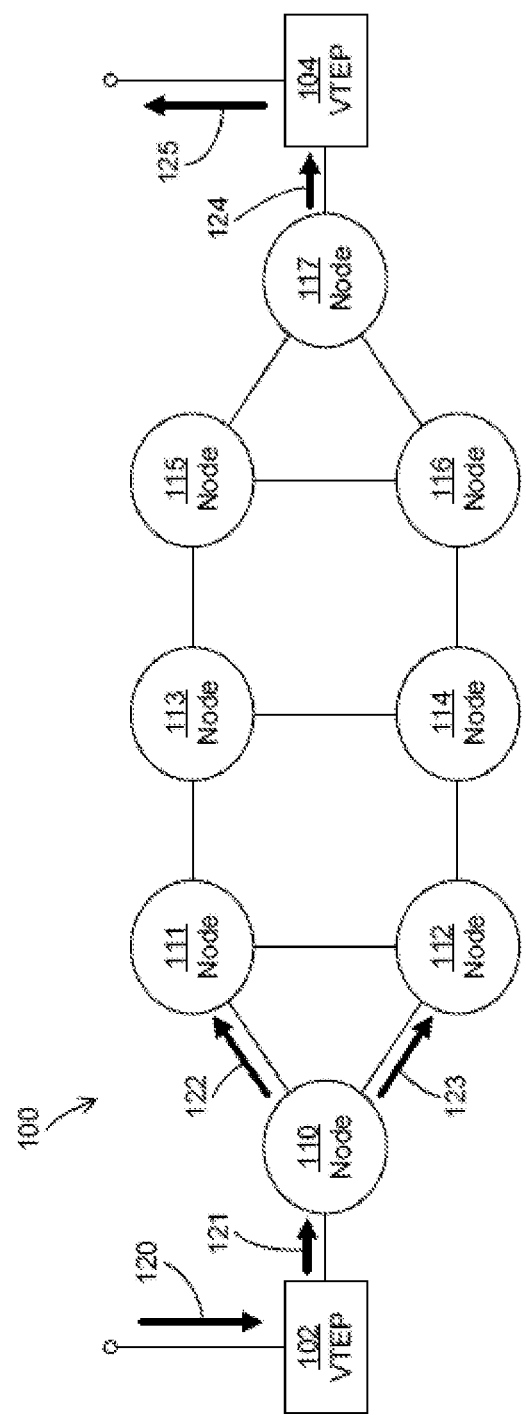
FIG. 1 presents a schematic view of elements of a communication network providing VxLANs using Equal-Cost Multi-Path (ECMP) routing.

FIG. 1 presents a schematic view of elements of a communication network 100 providing VxLANs using Equal-Cost Multi-Path (ECMP) routing. The communication network 100 includes VTEPs 102 and 104 and network nodes 110 through 117. The elements of the communication network 100 are coupled directly or indirectly to each other by Ethernet links. The Ethernet links may be wired, wireless, or optical communication links.

Operation of the communication network 100 is demonstrated by describing the passage of a single Ethernet frame from the VTEP 102 to the VTEP 104. In step 120, the VTEP 102 receives an Ethernet frame from a source Customer Equipment (CE) device (not shown). The VTEP 102 adds a VxLAN header to the Ethernet frame and, in step 121, sends the resulting VxLAN frame to the network node 110. The VxLAN header is described in more detail with reference to FIG. 3.

The network node 110 performs ECMP routing to determine whether to send the VxLAN frame to the network node 111 (in step 122) or to the network node 112 (in step 123). Each network node receiving the VxLAN frame performs ECMP routing to send the VxLAN frame on its next hop toward the VTEP 104. In step 124, the VxLAN frame is sent from the network node 117 to the VTEP 104. The VTEP 104 removes the VxLAN header from the VxLAN frame and sends the resulting, original Ethernet frame to the destination CE (not shown) in step 125.

As described above, one goal of VxLAN is to extend the VLAN address space by adding a 24-bit segment ID (VxLAN ID or VNI), increasing the number of available IDs to 16 million. The VxLAN segment ID in each frame differentiates individual logical networks so millions of isolated Layer 2 VxLAN networks can co-exist on a common Layer 3 infrastructure. As with VLANs, only virtual machines (VMs) within the same logical network can communicate with each other. However, a VxLAN tunnel (VTEP to VTEP) is not aware of traffic link status (simply forwarding using ECMP based on a User Datagram Protocol (UDP) header). Thus a VxLAN tunnel does not distinguish between 'elephant flows' (large data set that does not require fast transmission) from 'mice flows' (small data set that requires strict latency). This may cause elephant flows to take up a large amount of bandwidth and impact mice flows.

Figure 2:
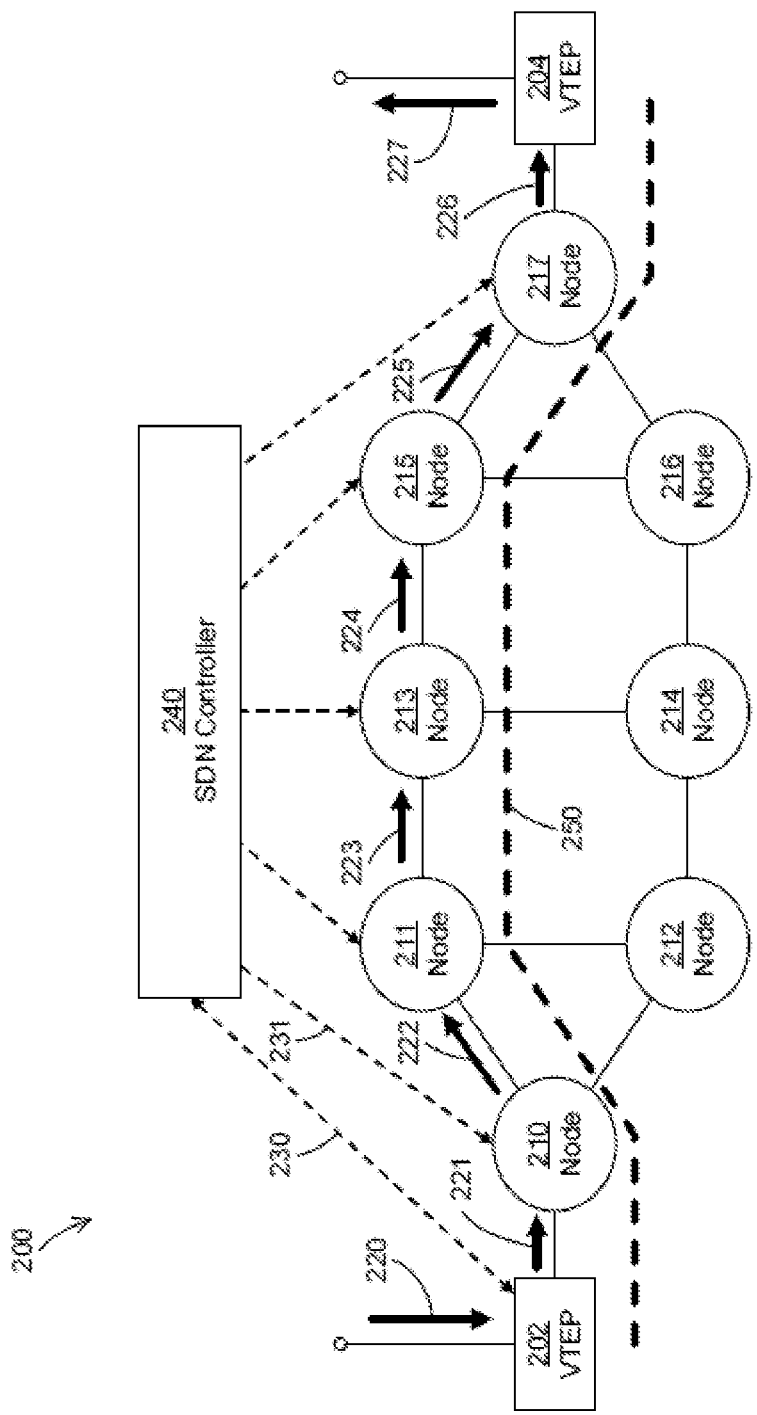
FIG. 2 illustrates a schematic view of elements of a communication network according to the disclosure providing VxLANs using SDN-based path computation.

FIG. 2 presents a schematic view of elements of a communication network 200 according to the disclosure providing VxLANs using SDN-based path computation. The communication network 200 includes VTEPs 202 and 204 and network nodes 210 through 217. The VTEPs 202 and 204 may also be referred to as network nodes. The communication network 200 also includes an SDN controller 240. The elements of the communication network 200 are coupled directly or indirectly to each other by Ethernet links. Ethernet links connecting the SDN controller 240 to other elements are not shown in FIG. 2 to improve the clarity of the figure. The Ethernet links may be wired, wireless, or optical communication links.

In step 230, the VTEP 202 sends a VxLAN tunnel request to the SDN controller 240. The VxLAN tunnel request includes an IP address of the VTEP 204, a VNI, and may specify TE tunnel requirements such as bandwidth, latency, duration, and others. As will be described in more detail with reference to FIG. 5, the VNI may be a conventional 24-bit VNI or may be larger, for example, a 32-bit VNI. In response, SDN Controller 240 determines a path, or ordered list of network nodes, for the requested VxLAN tunnel. The first node in the list is the VTEP 202 and the last node in the list is the VTEP 204. In the embodiment shown in FIG. 2, a VxLAN tunnel 250 is determined. The VxLAN tunnel 250 is defined by the list comprising the VTEP 202, the network nodes 210, 211, 213, 215, and 217, and the VTEP 204. The SDN controller 240 also assigns the VxLAN tunnel 250 a SvcPI. In the completion of step 230, the SDN controller 240 sends a command to the VTEP 202 that includes the SvcPI and an IP address of the next node in the list (network node 210). The command is configured to cause the VTEP 202 to convert a received Ethernet frame into a path-ID frame by prepending to the Ethernet frame an NSH encapsulation header comprising the SvcPI and the VNI. The VTEP 202 converts Ethernet frames that are directed to the VTEP 204, as indicated by an Outer MAC DA in the Ethernet frame.

To any intermediate nodes in the list between the VTEP 202 and the VTEP 204, the SDN controller 240 sends a command that includes the SvcPI, the VNI, and an IP address of the next node in the list. As an example, in step 231, the SDN controller 240 sends a command to the network node 210 that includes the SvcPI, the VNI, and an IP address of the network node 211. The commands sent to all but the VTEP 204 are configured to cause the receiving node to forward path-ID frames that include the SvcPI to the IP address of the next node in the list.

Once commands according to the disclosure have been sent to establish the VxLAN tunnel 250, when the VTEP 202 receives from a source CE an Ethernet frame in step 220, the VTEP 202 converts the received Ethernet frame into a path-ID frame and sends the path-ID frame to the network node 210 in step 221. In steps 222 through 226, the path-ID frame is forwarded respectively to network nodes 211, 213, 217, 217, and VTEP 204. The VTEP 204 converts the path-ID frame back into an Ethernet frame by removing the NSH encapsulation header and sends the remaining Ethernet frame to its destination CE in step 227.

The command sent by the SDN controller 240 to each node in the list may comprise one or more commands sent via a suitable signaling mechanism, such as Network Configuration Protocol (NETCONF) or Path Computation Element Communication Protocol (PCEP). The command(s) may be configured to cause the receiving node to store the SvcPI and the next node's IP address in its virtual routing and forwarding (VRF) table, or otherwise store an association between the SvcPI and the next node's IP address.

In some embodiments, the VTEP 202 adds a conventional VxLAN header to the received Ethernet frame that is directed to the VTEP 204. In such embodiments, the VNI used will be limited to 24 bits. In such embodiments, the network node 210 will recognize the VNI and will convert the VxLAN frame into a path-ID frame by replacing the VxLAN header with an NSH encapsulation header that includes the SvcPI and the VNI. The network node 210 will then forward the path-ID frame to the next node in the list. In such embodiments, the network node 217 will restore the VxLAN header to a conventional header before forwarding the frame to the VTEP 204.

The SDN controller 240 may receive In-situ Operations, Administration and Management (iOAM) data and Link State Data sent from network nodes via a PUSH mechanism (e.g., YANG-PUSH, which uses the YANG (Yet Another Next Generation) data modeling language). From this data, the SDN controller 240 may determine a VxLAN tunnel's nodes and links (path sequence or node list) and send forwarding instructions to each node in the list.

By determining a path for the VxLAN tunnel 250 requested in step 230, the SDN controller 240 provides traffic steering and traffic engineering capability in a VxLAN environment. The SDN controller 240 is able to establish VxLAN tunnels for elephant flows that do not impact VxLAN tunnels established for mice flows, and vice versa.

FIG. 3 illustrates a conventional VxLAN frame 300. The original Ethernet frame received by the VTEP 102 is indicated on the right side of FIG. 3, and its fields are defined in the Institute of Electrical and Electronics Engineers (IEEE) Standard for Ethernet, 802.3. The VxLAN header (or VxLAN Encapsulation) that the VTEP 102 adds to the original Ethernet frame to create the VxLAN frame 300 is shown on the left side of FIG. 3, and its fields are defined in the Internet Engineering Task Force (IETF) Request for Comments (RFC) 7348. The VxLAN header includes the IP address of the destination VTEP 104 (Outer IP DA) in field 302. The VxLAN header also includes the IP address of the source VTEP 102 (Outer IP SA) in field 304. And the VxLAN header includes a 24-bit VNI (VxLAN ID) in field 306. The Ethernet frame includes the fields Outer MAC DA 320 and Outer MAC SA 322.

FIG. 4 shows a VxLAN frame 400 comprising a first NSH encapsulation header according to the disclosure. The VxLAN frame 400 includes Outer IP DA 402, Outer IP SA 404, an Outer UDP Header 405, and the VNI 406. Between the Outer UDP Header 405 and the VxLAN ID 406 is inserted an NSH shim 408. The NSH shim 408 includes field 410 which includes an NSH Path-ID (NSH P-ID), or Service Path Identifier, as described with reference to FIG. 2, as well as other fields as defined in IETF RFC 8300. In a preferred embodiment, the NSH P-ID 410 is a 24-bit field, but may have a different length in other embodiments.

Figure 5:
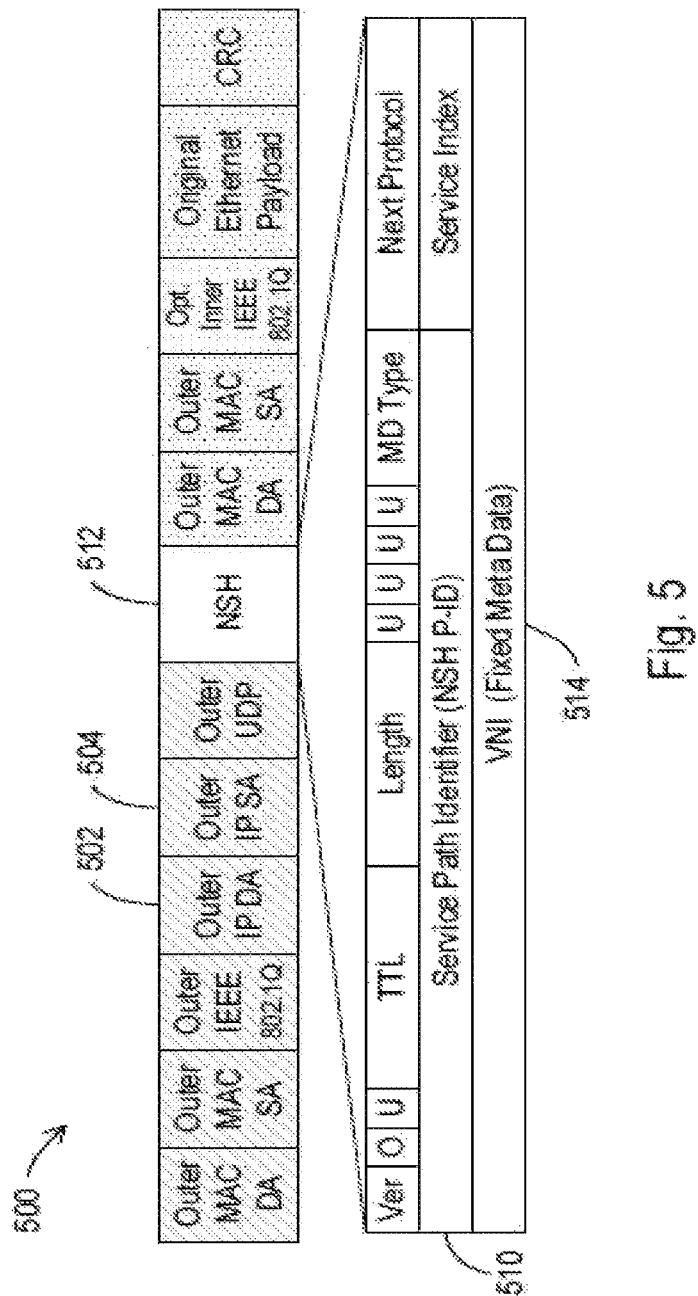
FIG. 5 shows a VxLAN frame comprising a second NSH encapsulation header according to the disclosure.

FIG. 5 shows a VxLAN frame 500 comprising a second NSH encapsulation header according to the disclosure. The VxLAN frame 500 includes Outer IP DA 502 and Outer IP SA 504. The VxLAN ID described with reference to FIG. 3 and FIG. 4 has been replaced by an NSH 512. The NSH 512 includes field 510 which includes an NSH Path-ID (NSH P-ID), or Service Path Identifier, as described with reference to FIG. 2, as well as other fields as defined in IETF RFC 8300. The NSH 512 also includes fixed meta-data that includes an expanded VNI 514. The VNI may be sized at 24-bits, to emulate the VNI is a standard VxLAN header.

However, in a preferred embodiment, the VNI 514 is a 32-bit field. Of course, the VNI 514 may have another length in other embodiments.

FIG. 6 presents a method 600 for establishing a VxLAN tunnel between VTEPs, according to the disclosure. For clarity, the method 600 is presented as performed by elements of the communication network 200 described with reference to FIG. 2, however in other embodiments, the method may be performed by other communication networks according to the disclosure.

In step 602, the SDN controller 240 receives a tunnel creation request from the VTEP 202 to establish a VxLAN tunnel from the VTEP 202 to the VTEP 204. The tunnel creation request includes an IP address of the VTEP 204 and a VNI. In step 604, the SDN controller 240 determines an ordered list of network nodes in the communication network 200, where a first network node 210 in the list is coupled to the VTEP 202 and a last network node 217 in the list is coupled to the VTEP 204. The network nodes 210, 211, 213, 215, and 217 in the list form a VxLAN tunnel from the VTEP 202 to the VTEP 204. In step 606, the SDN controller 240 assigns a SvcPI to the VxLAN tunnel.

In step 608, the SDN controller 240 sends a tunnel initiation command to the VTEP 202. The tunnel initiation command includes the SvcPI, the VNI, and an IP address of the network node 210. The tunnel initiation command is configured to cause the VTEP 202 to convert an Ethernet frame to a path-ID frame by adding an NSH encapsulation header to the Ethernet frame, and to forward the path-ID frame to the network node 210. In step 610, the SDN controller 240 sends a tunnel continuation command to any intermediate network nodes in the list between the VTEP 202 and the VTEP 204. The tunnel continuation command includes the SvcPI and an IP address of a corresponding next network node in the list. The tunnel continuation command is configured to cause the intermediate network node to forward a path-ID frame that includes the SvcPI to the IP address of the next network node in the list. In step 612, the SDN controller 240 sends a tunnel termination command to the VTEP 204. The tunnel termination command includes the SvcPI. The tunnel termination command is configured to cause the VTEP 204 to remove the NSH encapsulation header from a path-ID frame that includes the SvcPI and to forward the resulting Ethernet frame to an IP destination address specified in the Ethernet frame header.

FIG. 7 presents a method 700 for implementing a VxLAN tunnel between VTEPs, according to the disclosure. For clarity, the method 700 is presented as performed by elements of the communication network 200 described with reference to FIG. 2, however in other embodiments, the method may be performed by other communication networks according to the disclosure.

In step 702, the VTEP 202 sends to the SDN controller 240 a tunnel creation request. The tunnel creation request is configured to cause the SDN controller 240 to establish a VxLAN tunnel from the VTEP 202 to the VTEP 204. The tunnel creation request includes an IP address of the VTEP 204 and a VNI. In step 704, the VTEP 202 receives from the SDN controller 240 a tunnel initiation command. The tunnel initiation command includes a SvcPI for the VxLAN tunnel, the VNI, and an IP address of the network node 210.

In step 706, the VTEP 202 receives an Ethernet frame and converts the Ethernet frame to a path-ID frame by adding an NSH encapsulation header to the Ethernet frame. In step 708, the VTEP 202 sends the path-ID frame to the network node 210.

FIG. 8 presents a method 800 for implementing a VxLAN tunnel. For clarity, the method 800 is presented as performed by elements of the communication network 200 described with reference to FIG. 2, however in other embodiments, the method may be performed by other communication networks according to the disclosure. In step 802, the network node 210 receives a tunnel continuation command that includes a tunnel SvcPI and an IP address of the network node 211.

In step 804, the network node 210 receives from the VTEP 202 a path-ID frame that includes an NSH encapsulation header. In step 806, when a SvcPI in the NSH header matches the tunnel SvcPI, the network node 210 sends the path-ID frame to the network node 211. When the method 800 is performed by network node 217, it receives the path-ID frame from the network node 215 and when the SvcPI in the NSH header matches the tunnel SvcPI, sends the path-ID frame to the VTEP 204.

FIG. 9 is a schematic diagram of a network device 900 (e.g., SDN controller 240 or network node 210 through 217) according to an embodiment of the disclosure. The network device 900 is suitable for implementing the disclosed embodiments as described herein. In an embodiment, the network device 900 may be a decoder or an encoder. The network device 900 comprises ingress ports 910 and receiver units (Rx) 920 for receiving data; a processor, logic unit, or central processing unit (CPU) 930 to process the data; transmitter units (Tx) 940 and egress ports 950 for transmitting the data; and a memory 960 for storing the data. The network device 900 may also comprise optical-to-electrical (OE) components and electrical-to-optical (EO) components coupled to the ingress ports 910, the receiver units 920, the transmitter units 940, and/or the egress ports 950 for egress or ingress of optical or electrical signals.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the ingress ports 910, the receiver units 920, the transmitter units 940, the egress ports 950, and the memory 960. The processor 930 comprises one or more of SDN controller module 970, VTEP module 980, and/or network node module 990. The SDN controller module 970, the VTEP module 980, and the network node module 990 implement the disclosed embodiments described herein. For example, the SDN controller module 970 configures the processor 930 to establish a VxLAN tunnel between VTEPs, and the VTEP module 980 and the network node module 990 configures the processor 930 to implement a VxLAN tunnel between VTEPs. The inclusion of the SDN controller module 970, the VTEP module 980, and/or the network node module 990 therefore provide a substantial improvement to the functionality of the network device 900 and effect a transformation of the network device 900 to a different state. Alternatively, the SDN controller module 970, the VTEP module 980, and/or the network node module 990 are implemented as instructions stored in the memory 960 and executed by the processor 930.

The memory 960 comprises one or more disks, tape drives, and solid-state drives and may be used as an overflow data storage device, to store programs when such programs are selected for execution, and to store instructions and data that are read during program execution. The memory 960 may be volatile and/or non-volatile and may be read-only memory (ROM), random access memory (RAM), ternary content-addressable memory (TCAM), and/or static random-access memory (SRAM).

A method for establishing a tunnel between VTEPs including means for receiving at a Software Defined Network (SDN) controller a tunnel creation request from a first VTEP to establish a VxLAN tunnel from the first VTEP to a second VTEP, the tunnel creation request comprising an Internet Protocol (IP) address of the second VTEP and a VxLAN Network Identifier (VNI); means for determining an ordered list of network nodes in a communication network, where a first network node in the list is coupled to the first VTEP and a last network node in the list is coupled to the second VTEP, the network nodes in the list forming a VxLAN tunnel from the first VTEP to the second VTEP; means for assigning a Service Path Identifier (SvcPI) to the VxLAN tunnel; and means for sending a tunnel initiation command to the first VTEP, the tunnel initiation command comprising the SvcPI, the VNI, and an IP address of the first network node in the list, the tunnel initiation command configured to cause the first VTEP to convert an Ethernet frame to a path-identifier (path-ID) frame by adding a Network Service Header (NSH) encapsulation header to the Ethernet frame, and to forward the path-ID frame to the IP address of the next network node in the list.

A method for implementing a VxLAN tunnel between VTEPs including means for sending from a first VTEP to an SDN controller a tunnel creation request, the tunnel creation request configured to cause the SDN controller to establish a VxLAN tunnel from the first VTEP to a second VTEP, the tunnel creation request comprising an IP address of the second VTEP and a VNI; means for receiving from the SDN controller a tunnel initiation command, the tunnel initiation command comprising a SvcPI for the VxLAN tunnel, the VNI, and an IP address of a first network node in the VxLAN tunnel; and means for receiving an Ethernet frame and converting the Ethernet frame to a path-ID frame by adding an NSH encapsulation header to the Ethernet frame; and sending the path-ID frame to the IP address of the first network node in the VxLAN tunnel.

A method for implementing a VxLAN tunnel between VTEPs including means for receiving at a network node a tunnel continuation command comprising a tunnel SvcPI and an IP address of a next network device in a VxLAN tunnel; means for receiving at the network node a path-ID frame comprising an NSH encapsulation header; and, when a SvcPI in the NSH header matches the tunnel SvcPI, means for sending the path-ID frame from the network node to the IP address of the next network device in the VxLAN tunnel.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly or indirectly coupled or communicating with each other, may be directly or indirectly communicating through some interface, device, or intermediate component whether electrically, mechanically, or otherwise. Where a first element is shown or described as occurring in response to a second element, the first element may occur in direct response or in indirect response to the second element. Other examples of changes, substitutions, and alterations are ascertainable by one skilled in the art and could be made without departing from the spirit and scope disclosed herein.

What is claimed is:

1. An apparatus associated with a first virtual extensible local area network (VxLAN) tunnel end point (VTEP), comprising a processor and a non-transitory processor-readable storage medium having processor-executable instructions stored thereon, wherein the instructions, when executed by the processor, cause the apparatus to carry out the steps of:
   receiving a first frame, where the first frame is an Ethernet frame;
   sending a second frame to a network node, where the network node is comprised in a VxLAN tunnel between the apparatus and a second VxLAN tunnel end point (VTEP), where the second frame comprises a service path identifier (SvcPI) associated with the VxLAN tunnel; and
wherein the second frame comprises a VxLAN header comprising a network service header (NSH) shim; wherein the NSH shim comprises a VxLAN network identifier (VNI), and the VNI comprises more than 24-bits.

2. The apparatus of claim 1, wherein the NSH shim comprises the SvcPI.

3. The apparatus of claim 1, wherein the NSH shim further comprises a network service header (NSH) metadata, and the NSH metadata comprises the VNI.

4. The apparatus of claim 1, where the SvcPI is assigned by a controller to the VxLAN tunnel.

5. The apparatus of claim 1, where second frame further comprises an Internet Protocol (IP) address of the network node.

6. A method comprising:
   receiving a first frame, by a first virtual extensible local area network (VxLAN) tunnel end point (VTEP), where the first frame is an Ethernet frame; and
   sending, by the first VTEP, a second frame to a network node, where the network node is comprised in a VxLAN tunnel between the first VTEP and a second VTEP, where the second frame comprises a service path identifier (SvcPI) associated with the VxLAN tunnel; wherein the second frame comprises a VxLAN header comprising a network service header (NSH) shim, wherein the NSH shim comprises a VxLAN network identifier (VNI) and the VNI comprises more than 24-bits.

7. The method of claim 6, wherein the NSH shim comprises the SvcPI.

8. The method of claim 6, wherein the NSH shim further comprises a network service header (NSH) metadata, and the NSH metadata comprises the VNI.

9. The system of claim 6, where the SvcPI is assigned by a controller to the VxLAN tunnel.

10. The system of claim 6, where second frame further comprises an Internet Protocol (IP) address of the network node.

11. A system comprising:
    a first virtual extensible local area network (VxLAN) tunnel end point (VTEP), and
    a second VTEP;
    where the first VTEP is configured to receive a first frame, where the first frame is an Ethernet frame;

send a second frame to a network node, where the network node is comprised in a VxLAN tunnel between the first VTEP and a second VTEP, where the second frame comprises a service path identifier (SvcPI) associated with the VxLAN tunnel; and wherein the second frame comprises a VxLAN header comprising a network service header (NSH) shim, where the NSH shim further comprising a VxLAN network identifier (VNI); wherein the VNI comprises more than 24-bits.

12. The system of claim 11, wherein the NSH shim comprises the SvcPI.

13. The system of claim 11, wherein the NSH shim further comprises a network service header (NSH) metadata, and the NSH metadata comprises the VNI.

14. A non-transitory computer-readable storage medium comprising instructions which, when executed by a computer, cause the computer to carry out the steps of:

receiving a first frame, by a first virtual extensible local area network (VxLAN) tunnel end point (VTEP), where the first frame is an Ethernet frame;

sending, by the first VTEP, a second frame to a network node, where the network node is comprised in a VxLAN tunnel between the first VTEP and a second VTEP, where the second frame comprises a service path identifier (SvcPI) associated with the VxLAN tunnel; and wherein the second frame comprises a VxLAN header comprising a network service header (NSH) shim, wherein the NSH shim comprises a VxLAN network identifier (VNI) and the VNI comprises more than 24-bits.

15. The non-transitory computer-readable storage medium of claim 14, wherein, the NSH shim comprises the SvcPI.

16. The non-transitory computer-readable storage medium of claim 14, wherein the NSH shim further comprises a network service header (NSH) metadata, and the NSH metadata comprises the VNI.

17. The non-transitory computer-readable storage medium of claim 14, where the SvcPI is assigned by a controller to the VxLAN tunnel.

18. The non-transitory computer-readable storage medium of claim 14, where second frame further comprises an Internet Protocol (IP) address of the network node.

19. An apparatus associated with a first virtual extensible local area network (VxLAN) tunnel end point (VTEP), comprising a processor and a non-transitory processor-readable storage medium having processor-executable instructions stored thereon, wherein the instructions, when executed by the processor, cause the apparatus to carry out the steps of:

receiving a first frame, where the first frame is an Ethernet frame;

sending a second frame to a network node, where the network node is comprised in a VxLAN tunnel between the apparatus and a second VxLAN tunnel end point (VTEP), where the second frame comprises a service path identifier (SvcPI) associated with the VxLAN tunnel; and wherein the SvcPI is between an outer user datagram protocol (UDP) header and a VxLAN network identifier (VNI).

20. A method comprising:

receiving a first frame, by a first virtual extensible local area network (VxLAN) tunnel end point (VTEP), where the first frame is an Ethernet frame;

sending, by the first VTEP, a second frame to a network node, where the network node is comprised in a VxLAN tunnel between the first VTEP and a second VTEP, where the second frame comprises a service path identifier (SvcPI) associated with the VxLAN tunnel; and wherein the SvcPI is between an outer user datagram protocol (UDP) header and a VxLAN network identifier (VNI).

21. A non-transitory computer-readable storage medium comprising instructions which, when executed by a computer, cause the computer to carry out the steps of:

receiving a first frame, by a first virtual extensible local area network (VxLAN) tunnel end point (VTEP), where the first frame is an Ethernet frame;

sending, by the first VTEP, a second frame to a network node, where the network node is comprised in a VxLAN tunnel between the first VTEP and a second VTEP, wherein the second frame comprises a service path identifier (SvcPI) associated with the VxLAN tunnel; and wherein the SvcPI is between an outer user datagram protocol (UDP) header and a VxLAN network identifier (VNI).

* * * * *